United States Patent [19]

Sanaski

[11] 4,166,631

[45] Sep. 4, 1979

[54] SPORTS WHEELCHAIR

[76] Inventor: David E. Sanaski, 1726 S. 176th Ave., Buckeye, Ariz. 85326

[21] Appl. No.: 843,541

[22] Filed: Oct. 19, 1977

[51] Int. Cl.² .................................................. B62M 1/14

[52] U.S. Cl. ........................ 280/242 WC; 280/112 A; 280/211; 280/772; 297/DIG. 4

[58] Field of Search ............. 180/DIG. 3; 280/112 A, 280/772, 242 WC, 211, 661, 289 WC; 297/DIG. 4

[56] References Cited

U.S. PATENT DOCUMENTS

| | | | |
|---|---|---|---|
| 2,486,015 | 10/1949 | Everest et al. | 280/211 |
| 2,561,616 | 7/1951 | Everest et al. | 280/242 WC |
| 2,674,465 | 4/1954 | Carpezzi | 280/661 |
| 3,572,456 | 3/1971 | Healy | 280/112 A |
| 3,848,883 | 11/1974 | Breacain | 280/242 WC |
| 4,032,166 | 6/1977 | Montgomery | 280/112 A |

*Primary Examiner*—Joseph F. Peters, Jr.
*Assistant Examiner*—Donn McGiehan
*Attorney, Agent, or Firm*—Bacon & Thomas

[57] ABSTRACT

A wheelchair specially adapted for use in wheelchair sports is provided. An adjustable linking member between the wheelchair support struts is provided for permitting selective adjustment of the camber of the wheels and for permitting a "sway bar" action for greater stability. Further features provide adjustable positioning of the wheels and the casters for a selective preferred balance of maneuverability and stability.

13 Claims, 10 Drawing Figures

FIG. 1
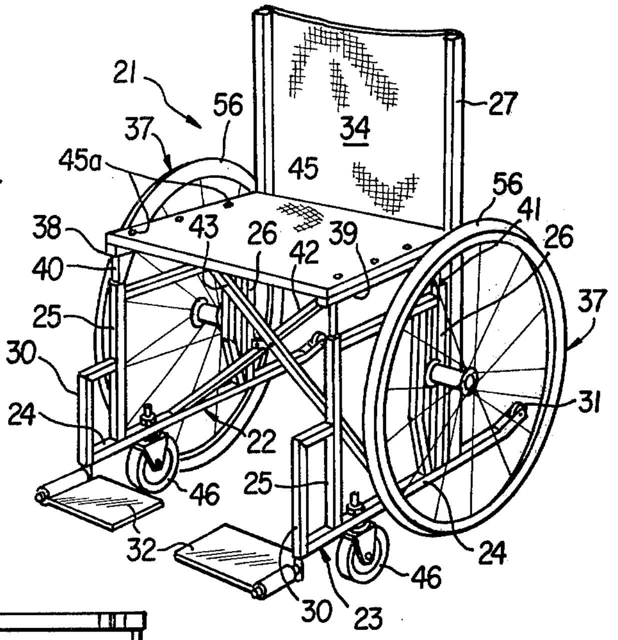
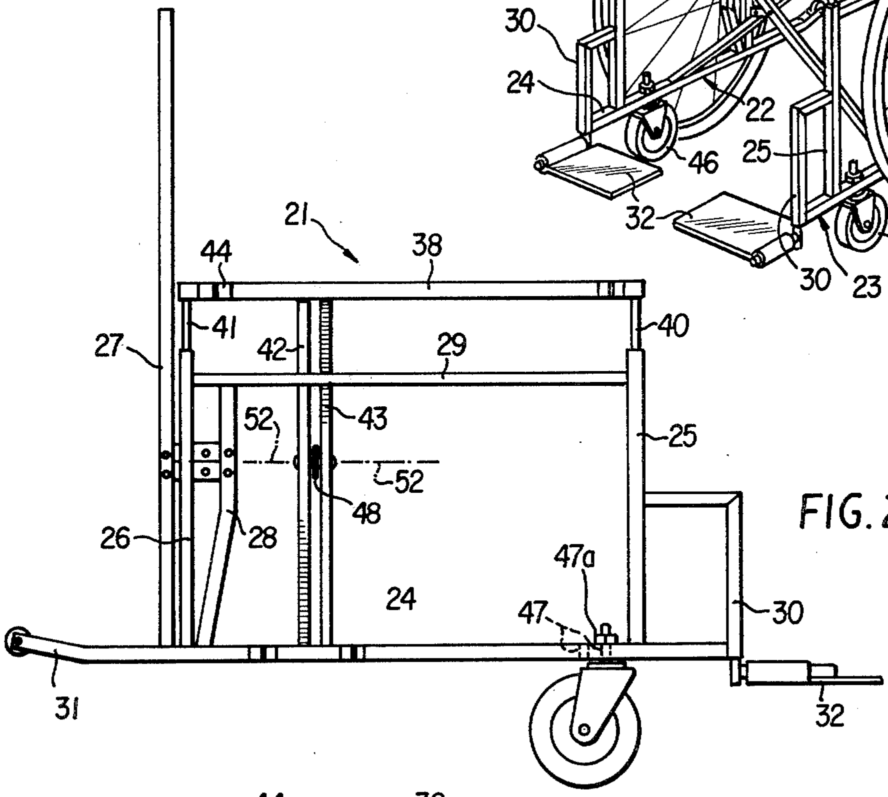
FIG. 2
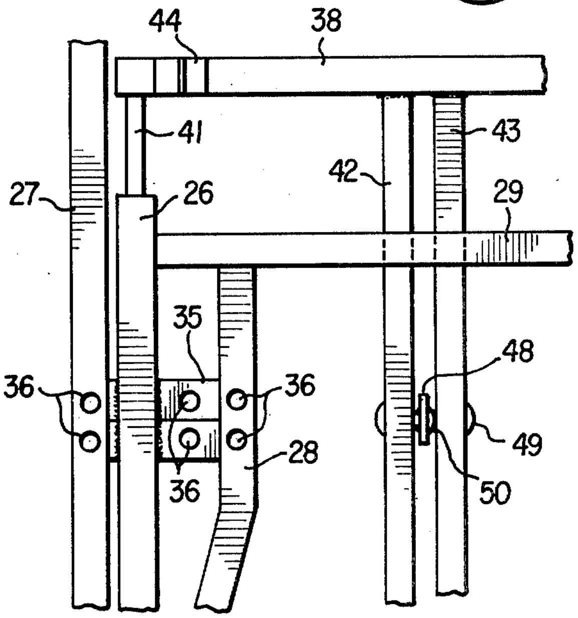
FIG. 3

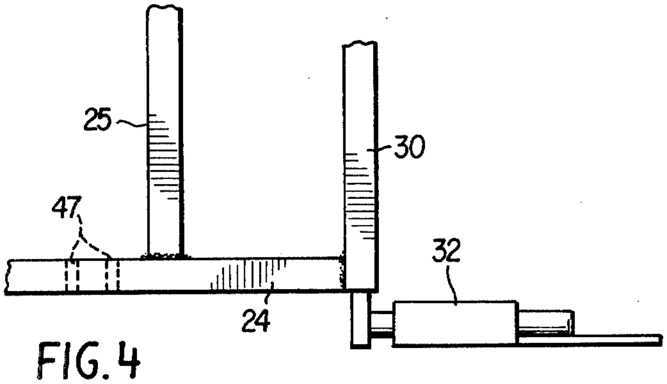
FIG.4
FIG.5
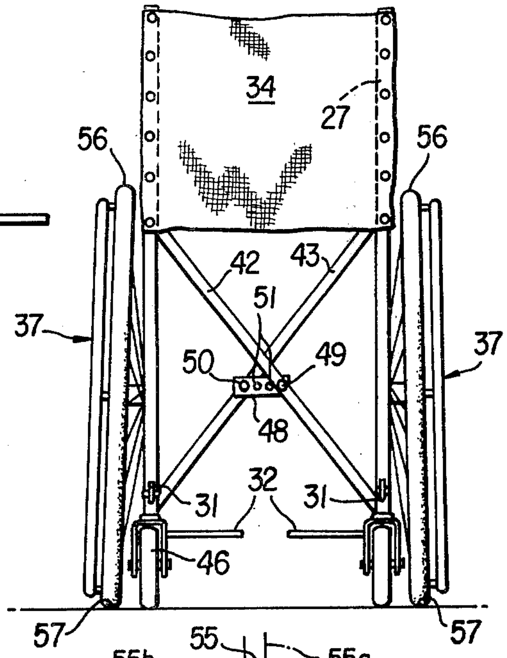
FIG.6
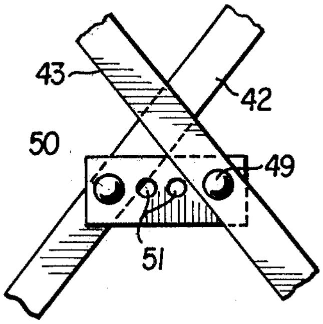
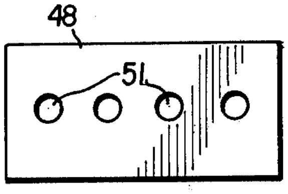
FIG.7
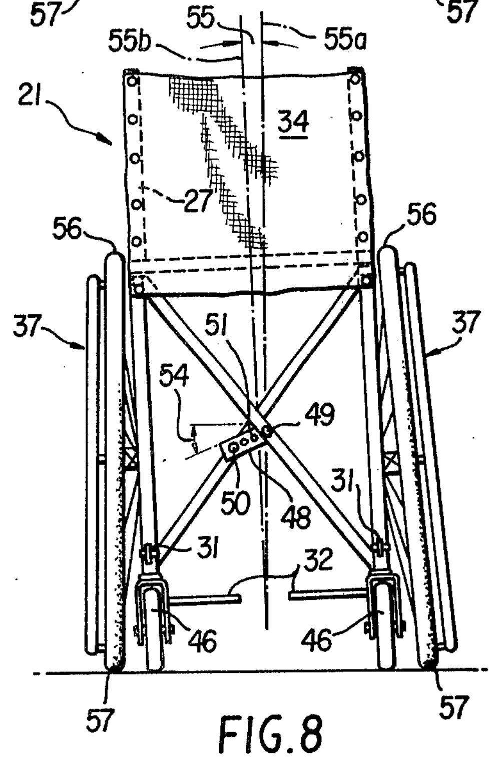
FIG.8
FIG.9
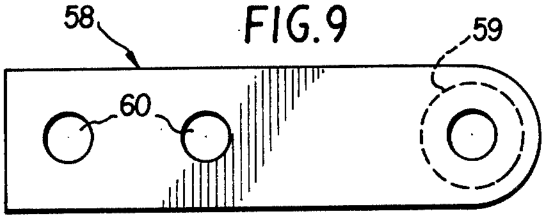
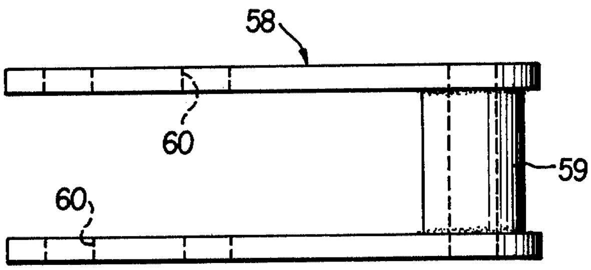
FIG.10

SPORTS WHEELCHAIR

BACKGROUND OF THE INVENTION

This invention has to do with a sports wheelchair and is more particularly concerned with such a wheelchair having novel support and adjustment means. Ordinary wheelchairs of the prior art are cumbersome and difficult to maneuver, and the primary concerns in the designs of such chairs have been the safety and comfort of the user. Among optional features which have been considered of value for use with ordinary wheelchairs are reclining or semi-reclining backs, narrow models for use in going through doors, padded seats, elevating leg rests, etc.

In recent years, there has been an evergrowing interest in sports in which the user of a wheelchair desires to participate, such as track, basketball and tennis. The ordinary wheelchair is not appropriate for this purpose due to lack of maneuverability and stability. Good athletes require equipment that is not only of high quality, but which also gives the user a competitive edge.

In the designing of sports wheelchairs, it is extremely important to the athlete that the chair be highly maneuverable. It is seen that on a basketball court, for example, the chair must give the user extreme mobility. Furthermore, this maneuverability must be accomplished while providing adequate stability for the user, whose chair will be tilting, swaying, bumping, etc. It is pointed out also that the athlete demands a chair which is lightweight and rugged.

It is also true, as with most competitive athletic equipment, that the user would prefer sufficient adaptability and adjustability built into the equipment so that the user may select that combination of settings and/or adjustments which are best for the user. This is especially important with respect to wheelchair equipment in that the nature and extent of different athletes' handicaps will vary considerably. Thus, it would be desirable if the athlete were able to adjust, according to his own preference, certain characteristics relating to the balance, stability, maneuverability, etc., of the chair depending upon the particular nature of his handicap, his particular mobility, and the particular sport involved.

Additionally, wheelchairs of the prior art have not provided appropriate positioning of the foot plates for the sake of safety and balance in sports; and most prior art attempts at solving that problem have been by way of placement of roller bars across the front of the foot plates.

Further, wheelchairs of the prior art have not provided a sufficiently independent suspension of the seat of the wheelchair to prevent the seat from binding up with other members of the chair, especially the back, during the movements encountered in sports, such as tilting and swaying.

All in all, the prior art efforts to modify known wheelchair constructions to provide a satisfactory sports wheelchair, which accomplishes the foregoing purposes and provides the foregoing features, have not been successful.

It would be highly advantageous, therefore, to provide a sports wheelchair which is not only well adapted for its use, but provides also for the solution of the other problems hereinbefore mentioned with respect to the prior art.

SUMMARY OF THE INVENTION

Accordingly, it is the primary object of the present invention to provide an improved sports wheelchair.

Another object of the present invention is the provision of a sports wheelchair having greatly increased maneuverability and mobility.

Still another object is to provide a sports wheelchair which is adjustable in a wide range by the user for the provision of optimum balance, stability, and maneuverability for that particular user.

Yet another object and feature of the present invention is the provision of a sports wheelchair permitting adjustment by the user of the camber of the wheels to provide increased stability for the user.

Yet still another object of the present invention is the provision of a sports wheelchair permitting the wheels of the chair to maintain contact with the floor even during tilting of the chair seat.

Even another object of the present invention is the provision of a sports wheelchair wherein the footrest positioning permits safer and more maneuverable use of the chair during athletic endeavors.

Yet another object of the present invention is the provision of a wheelchair wherein the seat of the chair is suspended in such independent fashion that the chair seat will not bind during the tilting and swaying which accompanies chair movement during athletic events.

Even another object of the present invention is the provision of a sports wheelchair of the above type which is efficient in its manner of operation, relatively inexpensive to manufacture, and which has a high degree of durability and serviceability.

Briefly, to accomplish the desired objectives of the present invention in accordance with the presently preferred embodiment thereof, there is provided a sports wheelchair having a first frame member including a first vertical female member and first base member and a first wheel rotatably mounted on this first frame member. This sports wheelchair also has a second frame member including a second vertical female member and a second base member and includes a second wheel rotatably mounted on this second frame member. Also the instant sports wheelchair includes a first chair support member including a first vertical male member slidable within said first vertical female member; and a second chair support member including a second vertical male member slidable within the said second vertical female member. A first strut member is located between the first base member and the second chair support member; and a second strut member is located between the second base member and the first chair support member. Further, there is provided a strut-linking member rotatably pinned to the first strut member along a first axis as a first point on the strut-linking member and rotatably pinned to the second strut member along the second axis at a second point on the strut-linking member. The first axis is substantially parallel to the second axis. Thus, there is provided a "sway bar" effect between the first and second wheels respectively mounted on the first and second frame members. Provision is also made for adjusting the distance between the said first and second points on the strut-linking member (whereby the extent of the camber between the wheels may be adjusted). The bottoms of the wheels may thus be adjustably and selectively set further apart than the tops of the wheels for added stability, etc. Multiple vertical and horizontal adjustments are also provided so that the user may selectively adjust the position at which the wheels are mounted on the frame members. Other features provide for selective positioning of the front casters, provide for added stability, maneuverability, safety, etc., and involve a special mounting of the footrest.

BRIEF DESCRIPTION OF THE DRAWINGS

Further and more specific objects and advantages of the present invention will become readily apparent to those skilled in the art from the following detailed description thereof taken in connection with the drawings, in which:

FIG. 1 is a perspective view of a preferred embodiment of the sports wheelchair of the present invention;

FIG. 2 is a side elevation of the sports wheelchair of FIG. 1 with the wheels removed;

FIG. 3 is a fragmentary side elevational view of a portion of the frame illustrating more clearly the preferred construction;

FIG. 4 is a fragmentary side elevational view illustrating the lower front portion of the frame and showing a footrest;

FIG. 5 is a rear elevational view of the wheelchair of FIG. 1 showing the elements thereof in the normal or rest condition or in condition of use when subjected to symmetrical loads;

FIG. 6 is a fragmentary front elevational view of a portion of the sports wheelchair illustrating the strut-linking member of the present invention in position;

FIG. 7 is a front elevational view showing only the strut-linking member of the present invention;

FIG. 8 is a rear elevational view of the sports wheelchair of FIG. 1 showing the elements thereof in a position other than the normal or rest condition, i.e. showing the elements when the wheelchair is in a leaning condition during use;

FIG. 9 is a front view of an optional wheel positioning member; and

FIG. 10 is a top view of the member of FIG. 9.

DETAILED DESCRIPTION OF THE PREFERRED EMBODIMENT

Turning now to the drawings, in which the reference numerals indicate corresponding elements throughout the several views, FIG. 1 and FIG. 2 illustrate the preferred sports wheelchair 21 of the present invention. As shown, wheelchair 21 includes a frame having a right frame member 22 and a left frame member 23. Each of the frame members 22 and 23 includes a base member 24, a front vertical female member 25, a rear vertical female member 26, a back support member 27, a generally vertical auxiliary support member 28, a horizontal support member 29, a vertical, bar-like footrest support portion 30 which is parallel to the front female member 25, and an anti-tipping device 31. Footrests 32 are connected frontwardly to each frame member 22 and 23. A chair back 34, preferably of foldable material, is attached to and between back support members 27. Socket support members 35 are connected between rear vertical female members 26 and vertical auxiliary support members 28. Each frame member 22 and 23 includes a plurality of holes or sockets 36 for selectively positionable wheel mounting. That is, each wheel 37 may be selectively positioned and mounted on its respective frame via one selected socket 36. It is seen that frame members 22 and 23 are of rugged yet lightweight construction and, in cooperation with the features hereinafter described, provide the advantages of the present invention.

There is further provided a right seat support, member 38 and a left seat support member 39. Each seat support member 38 and 39 includes front vertical male members 40 extending downwardly therefrom and rear vertical male members 41 extending downwardly therefrom. Each male member 40 and 41 is slidably positioned within the corresponding female members 25 and 26. It is desirable that the male members 40 and 41 be long enough so as still to be included within the respective female members 25 and 26 when wheelchair 21 is in a folded position, accomplished in a manner well known in the art.

A first diagonally disposed strut member 42 extends between right base member 24 and left seat support member 39, as shown. Similarly, a second diagonally disposed strut member 43 extends between the left base member 24 and right seat support member 38. Swivel members 44 are positioned in seat support members 38, 39 as shown to permit movement of strut members 42 and 43 with respect to one another, as for folding and other purposes hereinafter to be described. In particular, the ends of strut members 42, 43 are fixedly connected to base members 24 and seat support member 38 at certain connection points and swivel members 44 are disposed on each side of each connection point. Thus, the portions of base members 24 and seat support members 38, 39 between swivel members 44 are journaled to move independently of the remaining elements of frame members 22, 23.

A chair seat 45 is connected to and between the seat support members 38 and 39. To provide optimum conditions for sports activity, seat 45 preferably includes a rigid frame, over which a flexible material or fabric is relatively tightly fitted. Seat 45 is preferably disposed above seat support members 38, 39 and fastened to the regions thereof which are disposed between swivels 44 by conventional fasteners **45*a*. The seat construction and connection is such as not to substantially inhibit tilting movement of frame members 22, 23** as will be later described.

Referring particularly to FIG. 2, it is noted that seat support members 38, 39 are not directly connected with back support members 27, and, indeed seat support members 38, 39 may move vertically with respect to back support members 27 in an independent fashion. This independent movement of seat support members 38, 39 permits tilting of the frame members 22, 23 and allows for the leaning, swaying or pivoting movements which the wheelchair 21 will undergo during sports activities.

Front casters 46 are connected underneath each respective frame 22 and 23. Multiple wheel-positioning sockets 47 are located, as shown, in base members 24 to provide for selective positioning of front casters 46 by way of fasteners **47*a***.

There is further provided, as more clearly apparent from FIGS. 6, 7, and 8, a strut-linking member 48. Strut-linking member 48 is connected to first strut member 42, as shown, by a first rotatable pin-type connection 50 as shown in FIG. 6. Similarly, strut-linking member 48 is connected to second strut member 43 by a second rotatable pin-type connection 49 as shown in FIG. 6. Strut-linking member 48 includes multiple holes 51 for selective positioning and adjustment of the distance between connections 49 and 50. In particular, the strut-linking member 48 is rotatably pinned to strut members 42, 43 along axes 52 (FIG. 2) which are parallel to each other. The construction and operation of strut-linking member 48 provides numerous features and advantages in connection with the present invention to be more particularly hereinafter spelled out.

With particular reference to FIG. 4, a preferred footrest mounting is illustrated. In commonly used wheelchairs the footrest is inclined outwardly in the forward direction and the footrest assumes an outwardly disposed, inclined disposition. In the present invention, however, bar-like support portion 30 for the footrest 32 is vertical, thus providing for a generally vertical disposition of the lower portion of the user's legs and effecting positioning of his feet more inwardly with respect to the overall wheelchair 21. This provides greatly increased safety and improved balance for the athlete-user during sporting events.

With particular reference to FIG. 8 which shows the wheelchair 21 under condition of stress in use, many of the advantages of the wheelchair construction of the present invention will be more readily apparent. In this regard, line **55*a* represents the vertical (i.e. a line perpendicular to the floor) and line 55*b* represents the central upright axis of the wheelchair 21. As illustrated, wheelchair 21 is shown tilted to the right a degree and with an angle of tilt illustrated at 55. As shown, when wheelchair 21 is in this position, strut-linking member 48 is tilted from the horizontal as shown at 54. The tilting from the normal condition is caused by asymmetrical loads during use, such as by leaning of the occupant or fast, forceful cornering. The beginning and final positioning, as wheelchair 21 tilts, of the wheels 37 is most clearly explained by making reference to the tops 56 of wheels 37 and the bottoms 57 of wheels 37. As can be seen (also with reference to FIGS. 6 and 7), it is preferred that the placement of strut-linking member 48 and the distances between holes 51 of strut-linking member 48 be such that the normal position of strut-linking member 48 when wheelchair 21 is not tilted be horizontal as shown best in FIGS. 5 and 6**.

It is highly preferred that the position of strut-linking member 48 and the location of holes 51 in strut-linking member 48 be such that the installation of strut-linking member 48 in any of its alternative positions provides a "camber" effect to wheels 37. This is best seen in FIG. 5 which shows wheelchair 21 in its rest condition or condition of symmetrical loads during use, such as the straight running condition. That is, tops 56 of wheels 37 will be closer together than the bottoms 57 of wheels 37. It can be seen by reference to FIG. 8 that this camber effect is true for wheelchair 21, irrespective of any tilting of the chair. The athlete-user, depending upon personal preferences and the athletic endeavor involved, will select the amount of camber desired. It is seen that this camber effect provides greater stability for wheelchair 21 than would normally be the case and greatly increases the maneuverability and mobility of wheelchair 21. For the location of strut-linking member 48 as shown, it is seen that the camber effect between wheels 37 is decreased as the distance between connectors 49 and 50 is made smaller. It is presently preferred that the connectors 49 and 50 be made, respectively, to strut members 42 and 43 at the midpoints of said strut members 42 and 43.

Again, with particular reference to FIG. 8, it is seen that as wheelchair 21 tilts, as during athletic action, strut-linking member 48 is free to tilt also, thus providing a "sway bar" effect. That is, bottoms 57 of wheels 37 will tend to remain firmly on the floor and provide great stability even during such tilting.

With particular reference to FIG. 3, it is seen that the holes or sockets 36 for mounting the wheels 37 may be selected both as to horizontal and vertical location. The wheel mounting positions are selected in accordance with the physical characteristics of the person using wheelchair 21, that person's specific handicap and balance requirements, the specific sport being attempted, and even the "feel" which the athlete desires. That is, the wheelchair of the present invention obviously provides the adjustability required so that the athlete-user may position wheels 37 of the sports wheelchair 21 at the most desirable location for the athlete-user.

With particular reference to FIGS. 9 and 10, there is illustrated an optional wheel-positioning adapter 58 including a socket 59 for mounting of a wheel 37. Positioning holes 60 in adapter 58 permit mounting to a wheelchair frame. That is, positioning holes 60 may be brought into registry with wheel mounting holes 36 and attached thereto by fasteners (not shown). A wheel 37 may then be mounted at an offset location on the wheelchair 21 via socket 59. The wheel positioning adapter 58 may be used in connection with the wheelchair of the present invention to provide even greater positioning flexibility for the wheels 37 where desired. Adapter 58 may also be used with wheelchairs of the prior art so that the athlete-user may position the wheels of his chair further forward than the present capabilities of such chairs, this being the direction which the athlete-user will normally desire for wheelchair sports.

It is thus seen that many advantages not heretofore available may be thus obtained with the sports wheelchair of the present invention.

Various changes in the device herein shown for the purpose of illustration will readily occur to persons skilled in the art. Such modifications and variations, while not explicitly denoted in the foregoing detailed description of the preferred embodiment, do not deviate from the teachings of the present invention and are intended to be included in the spirit and scope thereof, and the scope of the present invention is intended to be limited only by a fair interpretation of the following claims:

What is claimed is:

1. A sports wheelchair comprising:
(a) a first frame member including a first vertical female member and a first base member;
(b) a first wheel rotatably mounted on said first frame member;
(c) a second frame member including a second vertical female member and a second base member;
(d) a second wheel rotatably mounted on said second frame member;
(e) a first seat support member including a first vertical male member slidable within said first vertical female member;
(f) a second seat support member including a second vertical male member slidable within said second vertical female member;
(g) a first strut member between said first base member and said second seat support member;
(h) a second strut member between said second base member and said first seat support member; and
(i) a strut-linking member rotatably connected to said first strut member along a first axis at a first point on said strut-linking member and rotatably connected to said second strut member along a second axis at a second point on said strut-linking member, said first axis being spaced from said second axis and being substantially parallel to said second axis, whereby a "sway bar" effect is obtained between said first and second wheels respectively mounted on said first and second frame members.

2. A sports wheelchair as defined in claim 1 wherein the distance between said first and second points on said strut-linking member is adjustable.

3. A sports wheelchair as defined in claim 2 wherein said distance is adjustable within ranges providing a selected camber to said first and second wheels respectively mounted on said first and second frame members, whereby the bottoms of said wheels are further apart than the tops of said wheels.

4. A sports wheelchair as defined in claim 1 wherein the respective connections between said strut-linking member and said first and second struts are at the respective midpoints of said first and second struts.

5. A sports wheelchair as defined in claim 1 including means on each frame member for selectively adjusting the position of the wheel mounted thereon with respect to such frame member.

6. A sports wheelchair as defined in claim 1 including a front caster wheel on each frame and means associated with each frame for selectively mounting said caster wheel thereon in any of a plurality of locations.

7. A sports wheelchair as defined in claim 1 including a bar-like support member on each frame member, each bar-like member being substantially parallel to the female member of its respective frame members.

8. A sports wheelchair as defined in claim 1 including a back support member attached to said frame members, said seat support members including portions journaled for movement entirely independently of the movement of said back support member.

9. A sports wheelchair as defined in claim 1 including a wheel-positioning adapter having a wheel socket substantially spaced from a connecting means for connecting the said adapter to the wheelchair.

10. A sports wheelchair comprising:

(a) a first generally upright frame member;

(b) a first wheel rotatably mounted on said first frame member;

(c) a second generally upright frame member spaced from said first frame member;

(d) a second wheel rotatably mounted on said second frame member, said first and second wheels having tops and bottoms;

(e) a wheelchair seat supported by said first and second frame members and extending therebetween; and (f) means extending between said first and second frame members for coupling said frame members together in selectively variable dispositions with respect to each other to provide a distance between the tops of said wheels which is different than the distance between the bottoms of said wheels to render the camber of said wheels selectively adjustable.

11. A sports wheelchair as defined in claim 10 wherein said frame includes first and second frame members and diagonally extending struts interconnecting said first and second frame members, said adjusting means including a strut-linking member extending between each strut of said pair and pivotally affixed to each strut by a pair of pivotal connection means, said strut-linking member including means for varying the distance between pivotal connection means thereof, said distance varying means including a series of holes in said strut-linking member, said pivot connection means including pins cooperating with selected holes of said series of holes in said strut-linking member.

12. A sports wheelchair comprising:

(a) a frame including a first frame member having a first wheel rotatably mounted thereon and a second frame member having a second wheel rotatably mounted thereon, said first and second wheels being disposed opposite each other;

(b) a wheelchair seat extending between said first and second frame members;

(c) caster means connected with said frame and spaced from said first and second wheels; and (d) means for coupling together, spacing apart, and effecting relative limited tilt and movement of said first and second frame members, said coupling, spacing, and effecting means causing said first and second frame member to assume a first position with respect to a vertical axis, said first position corresponding to the position of the frame members when the sports wheelchair is at rest or is under symmetrical forces in use, said coupling, spacing, and effecting means allowing said frame members to undergo limited tilting movement to assume positions other than said first position with respect to the vertical while maintaining the spacing between said frame members, said other positions accommodating stable leaning of the sports wheelchair during sports activity.

13. A sports wheelchair as defined in claim 12 wherein said first frame member includes a first horizontal base member and a first horizontal seat support member; wherein said second frame member includes a second horizontal base member and a second horizontal seat support member; said wheelchair seat being connected with said seat support members; and wherein said coupling, spacing, and effecting means includes a pair of diagonally extending struts between said base members and seat support members, said struts having ends fixedly connected to said base members and seat support members at connection points, each base member and seat support member having a swivel member at each side of each connection point to permit tilting movement of said frame members with respect to said first position, said coupling, spacing, and effecting means also including a strut-linking member extending between said diagonal struts and pivotally connected to each of said struts, said strut-linking member maintaining the spacing and limiting the tilting movement of the first and second frame members.

* * * * *